US006983353B2

(12) United States Patent
Tamer et al.

(10) Patent No.: US 6,983,353 B2
(45) Date of Patent: Jan. 3, 2006

(54) METHOD AND APPARATUS FOR ENHANCING OPERATIONS IN DISK ARRAY STORAGE DEVICES

(75) Inventors: Philip E. Tamer, Westboro, MA (US); Douglas E. LeCrone, Hopkinton, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 337 days.

(21) Appl. No.: 10/134,420

(22) Filed: Apr. 29, 2002

(65) Prior Publication Data
US 2003/0204692 A1 Oct. 30, 2003

(51) Int. Cl.
*G06F 12/00* (2006.01)
(52) U.S. Cl. .................. 711/163; 711/141; 711/148; 711/152; 711/167
(58) Field of Classification Search ................ 711/163, 711/167, 148, 152
See application file for complete search history.

(56) References Cited

U.S. PATENT DOCUMENTS

| 6,101,497 A | 8/2000 | Ofek | 707/10 |
| 6,370,626 B1 | 4/2002 | Gagne et al. | 711/154 |
| 6,785,793 B2 * | 8/2004 | Aboulenein et al. | 711/167 |
| 2001/0021967 A1 * | 9/2001 | Tetrick | 711/163 |

* cited by examiner

*Primary Examiner*—Mano Padmanabhan
*Assistant Examiner*—Midys Rojas
(74) *Attorney, Agent, or Firm*—George A. Herbster

(57) ABSTRACT

A method and apparatus for assuring data consistency during certain operations involving dependent input/output sequences. During such operations a stall application blocks write operations to specified logical devices in a local consistency group while allowing read operations to all devices and write operations to non-specified logical devices. When a write command is directed to a logical device in local consistency group, the host adapter associated with the logical device returns a message to the host that initiates a write command retry. Retries generally continue until a write command is successful.

42 Claims, 12 Drawing Sheets

METHOD AND APPARATUS FOR ENHANCING OPERATIONS IN DISK ARRAY STORAGE DEVICES

BACKGROUND OF THE INVENTION

1. Field of the Invention

This invention relates to data processing systems with disk array storage devices and more specifically to methods and apparatus that enhance operations in such disk array storage devices, particularly with applications that operate on such data processing systems and that produce dependent input/output sequences with disk array storage devices.

2. Description of Related Art

A conventional data processing system that handles large quantities of data generally includes one or more hosts and a disk array storage device, or DASD. Other systems may include multiple disk array storage devices. A host generally includes one or more control processors, main memory and input and output devices. A host executes programs, also called applications, that operate on data transferred to the main memory from the disk array storage devices as known in the art. Disk array storage devices, such as those manufactured and sold by the assignee of this invention, include many physical storage devices, or magnetic disk drives, organized as logical storage volumes or logical devices.

A disk array storage device operates with a host adapter or equivalent module that receives a variety of input/output commands from a host over a channel in a host dependent format. The host adapter translates those host input/output commands, or host requests, into a format that disk adapters, or equivalent structures, in the disk array storage device recognize and use to direct operations at a logical device level. When an operation completes in the disk array storage device, the host adapter transmits a status word or message to the host to report either the success of the operation or the reason for a failure. Two specific commands that are important to this invention are "read" and "write" commands. A read command from a host effects a transfer of data from the disk array storage device to the host; a write command, a transfer to the disk array storage device from the host.

Significant efforts have been made to enhance the operation and performance of disk array storage devices in response to read and write commands from primary applications, such as are used in airline or banking operations. Also, efforts have been directed to enabling disk array storage device operations that are ancillary to the primary applications. A backup application is one example of such an ancillary application. Particular emphasis has been placed upon enabling such ancillary applications to operate without interrupting any primary applications running on the host. For example, it is obviously desirable to allow a database backup without interrupting any of the transactions underway with the various users of a primary application.

U.S. Pat. No. 6,101,497 to Ofek for a Method and Apparatus for Independent and Simultaneous Access to a Common Data Set, assigned to the same assignee as this invention, discloses a concept for achieving such operations. In accordance with that disclosure, certain physical disk drives in a disk array storage device are configured to be available to the primary applications. These are called "standard devices". Other logical devices are configured to act either as a mirror for a standard logical device or to be split to provide a copy of the data on the standard device for some other purpose such as interaction with an ancillary application. In the context of the systems manufactured by the assignee of this invention, the second logical devices are called "BCV devices". When BCV devices are incorporated, a BCV device initially attaches to a standard device to act as a mirror. Generally speaking, anytime after the BCV device has achieved synchronism with the standard device, the BCV device can be split, or detached, from the standard device. The data on the BCV device is then available to an ancillary application. This allows the ancillary application to act on the data on the BCV device independently of and simultaneously with the continued operation of a primary application with data stored on the standard device.

As the use of such data processing systems has grown, certain issues that impact the splitting of a BCV device from its corresponding standard device have appeared. These include an issue of pending write data operations. Disk array storage devices of many manufacturers, including those of the assignee of this invention, utilize cache memory to enhance performance, particularly for write operations. When a host issues a write command, the data to be written transfers only to the cache memory before a host adapter signals a host that the write operation is complete. The newly written data actually remains in the cache for some interval before that data, or overwritten data to the same location, transfers to the logical device storage medium. During that transient interval in the cache, the operation is complete with respect to the host, but pending with respect to physical disk device. Such cache entries are called "write pending" entries. The process of transferring a "write pending" entry to a logical device storage medium is called "destaging".

Efforts have been made to manage write pending entries during operations of BCV devices. The objective of such efforts has been to assure that a BCV device, after it is split, accurately reflects the data on the standard device at the time of the split, including any write pending entries at the time that the split occurred. It is also an objective to minimize the impact of any such split operation on the main operations. For example, U.S. Pat. No. 6,370,626 to Gagne et al. discloses a Method and Apparatus for Independent and Simultaneous Access to a Common Data Set that reduces any interruption by implementing an "instant split" operation. When an "instant split" command is received, a corresponding BCV device immediately detaches from the standard device and becomes accessible to an alternate application. This occurs under a lock condition that lasts in the order of microseconds during which certain control operations are accomplished but no data is transferred and no write pending entries are managed. Immediately thereafter the lock is released. Various processes in the disk array storage device thereafter manage the write pending entries in an orderly fashion even as the primary application interacts with the standard device and an ancillary application, such as a backup application, interacts with the BCV device.

Applications and related data storage requirements constantly increase in complexity and volume. In the past some applications and associated data were stored entirely on a single standard device. Now such applications and associated data may be stored on multiple standard devices in a single disk array storage device. Other applications even require a storage capacity that exceeds the capacity of a single disk array storage device necessitating the distribution of a single application and its data over two or more disk array storage devices, each with up to hundreds of standard devices.

A database application is one example of an application in the last category. That is, one set of standard devices may contain the database data while another set of standard devices contains an associated log file, and these standard devices may be in different disk array storage devices. With these applications it may also be desirable to obtain a copy of the data and log files for independent processing. One approach uses an "instant split" operation as described in U.S. Pat. No. 6,370,626. However, with multiple standard devices in separate disk arrays, a host has to issue one instant split command to each set of BCV devices. Moreover, each discrete instant split operation is dispatched separately. Therefore the order in which the instant split commands are processed for different BCV devices is unpredictable.

For example, dependent input/output (I/O) sequences in database applications involve three write operations. The first write operation transfers an entry through a cache to a log file establishing the fact that data is to be written. The second write operation transfers the data to the cache for destaging to a standard device. The third write operation transfers another log entry to the cache for the log file; this entry indicates that the operation is complete. If multiple instant split commands issue so that the instant split for the logical volume containing the data is completed first, the data file may be updated without updating the log file in the BCV devices. In that event, the log file in the BCV device would not contain a record of the data change in another split BCV device. Alternatively if the log files were destaged and updated before the data file was updated, the log file could indicate the completion of an operation without the data actually having been transferred to the split BCV devices. Under either scenario, the data in the split BCV device is inconsistent.

It is difficult at best to identify any such inconsistent data. Consequently it became necessary to enable such instant split and other similar BCV device operations to occur while maintaining consistent data on multiple split BCV devices. U.S. patent application Ser. No. 09/613,118 filed Jul. 10, 2000 to Douglas E. LeCrone and Eugene D. Pflueger for a Method and Apparatus for Enhancing Recovery Operations in a Disk Array Storage Device discloses one such solution. In accordance with the disclosure, a special command to split the BCV devices is translated into one or more request data structures that identify the BCV devices as being involved in a consistent split operation. The command establishes a system lock over those particular BCV devices to be split. A host generates the lock.

The lock raises the I/O interrupt level to block user I/O operations to all logical devices connected to a host. That, is, while I/O interrupt level is raised, user applications cannot interact with any logical device by reading or writing data even with logical devices for which consistency is not a concern. Although every effort is made to minimize the duration of such interruptions, there still is a finite interruption interval. In certain applications, that interruption interval can be excessive.

This process may not always be effective in maintaining data consistency in multiple host environments where applications in different hosts can interact with data in one or more common logical volumes. As an example, assume that first and second host applications can interact with data in at least one common logical volume. Assume further that the first host has established a consistency group including any common logical volumes. When the first host initiates a splitting operation, it issues a lock to prevent that host from issuing any input/output operations to any logical volume. However, nothing prevents an application in the second host from transferring data to any of the common logical volumes. If that occurs, the data in the logical volumes may lose its consistency.

Therefore what is needed is a method and system for establishing consistency groups with certain additional criteria. For example, such a consistency group should be capable of including logical volumes from one or more data storage facilities. A consistency group should be capable of maintaining consistent data even when applications in multiple hosts have access to data in any common logical volume. Moreover, the establishment of a consistency group should have a minimal impact on normal data processing operations, including minimizing any interval during which access to data in any logical volume is blocked by a host lock or other like operation.

SUMMARY

Therefore it is an object of this invention to provide a method and apparatus for enhancing operations with a disk array storage device by minimizing certain delays that can be encountered in operations with consistency groups.

Another object of this invention is to provide a method and apparatus for minimizing certain delays in the operation of a disk array storage device with logical volumes in consistency groups, particularly with respect to operations involving dependent I/O sequences.

Still another object of this invention is to provide a method and apparatus for assuring data consistency during certain operations of a disk array storage device with logical volumes that can be accessed from host applications in multiple hosts.

Yet another object of this invention is to provide a method and apparatus for assuring consistency of data during certain operations of a disk array storage device during the execution of a dependent I/O sequence.

Still another object of this invention is to provide a method and apparatus for assuring data consistency in disk array storage devices during certain operations of the disk array storage devices involving dependent I/O sequences.

Yet still another object of this invention is to provide a method and apparatus for establishing consistency groups that are capable including logical volumes from one or more data storage facilities.

Still yet another object of this invention is to provide a method and apparatus for establishing consistency groups that are capable of maintaining consistent data even when applications in multiple hosts have access to data in any common logical volume.

Yet another object of this invention is to provide a method and apparatus for establishing a consistency group that has a minimal impact on normal data processing operations, particularly minimizing any interval during which access to data in any logical volume is blocked.

In accordance with this invention, data consistency in a group of logical devices in one or more disk array storage devices is maintained by establishing a plurality of logical devices as a local consistency group with a reject window having an open state that extends for a predetermined interval and a closed state. Each write operation to a logical device in the defined consistency group is blocked while the reject window is in the open state. When a write operation is blocked, a predetermined message is returned to the host processor indicating the blocked write operation.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
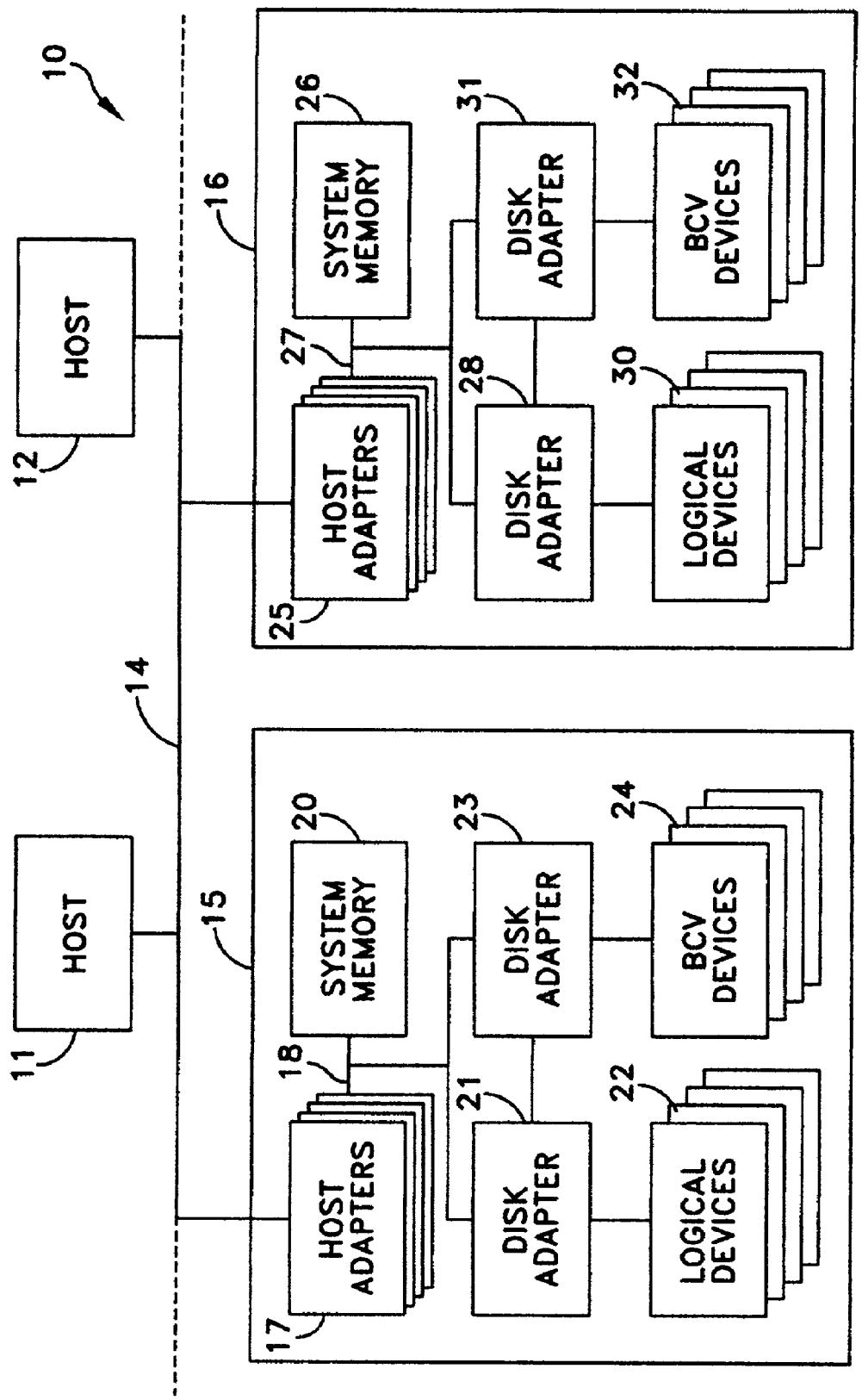
FIG. 1 is a block diagram of a typical data processing system adapted for utilizing this invention.

FIG. 1 represents a multiple host, multiple disk array storage device system 10. For purposes of illustration the system 10 includes two hosts 11 and 12. Each host, as known, includes a host processor, memory and peripheral devices. Each host connects to a bus 14 that can extend to other hosts. The bus 14 may comprise a single communication path or parallel paths.

The bus 14 also connects to multiple disk array storage devices. FIG. 1 discloses a disk array storage device (DASD) 15 and a DASD 16 by way of example. Each DASD has the same basic structure. Using the DASD 15, as an example, a host adapter 17 acts as an interface with the bus 14 and includes processor-operated circuits or modules for performing various functions and controlling the other elements of the DASD 15. The host adapter communicates over an internal DASD bus 18 with other components including a system memory 20. The system memory 20 acts a global memory for various modules in the DASD 15 and as a cache memory for data.

The DASD 15 also includes a disk adapter 21 and logical devices 22 controlled by the disk adaptor 21 as standard devices. A disk adapter 23 connects to a one or more devices configured as BCV or like devices 24. The disk adapters 21 and 23 connect to the host adapter 17 and system memory 20 by means of the internal DASD bus 18. The internal DASD bus 18 can also connect to additional disk adapters and their related logical devices.

A logical device, such as the logical devices 22, comprises a number of contiguous tracks or data blocks on one or more physical disk drives. That is, a logical device can include a portion or subset of the tracks on a physical device, all the tracks on a physical device or tracks on multiple physical disk drives.

The DASD 16 has a structure that is analogous to the DASD 15. That is, the DASD 16 includes a host adapter 25 and a system memory 26 interconnected by an internal DASD bus 27 that attaches to a disk adapter 28 with its standard logical devices 30 and a disk adapter 31 with its BCV logical devices 32. The internal DASD bus 27 may also attach to other disk adapters and their logical standard or BCV devices.

As known, during general operations one of the hosts 11 and 12 can issue a write command to a specific location within a standard logical device. A host adapter such as host adapter 17 or 25, responds to that write command by performing a number of functions. The primary functions include transferring the data included with the write command to cache memory, such as the system memory 20 and thereafter, according to some protocol destaging that data from the system memory 20 to a specified track or tracks in the identified standard logical device. For a read command from a host, a host adapter transfers the data from the cache memory in the system if the data is present. Otherwise, the host adapter transfers data from the specified standard logical device to the cache memory and then from the cache memory back to the requesting host.

Figure 1A:
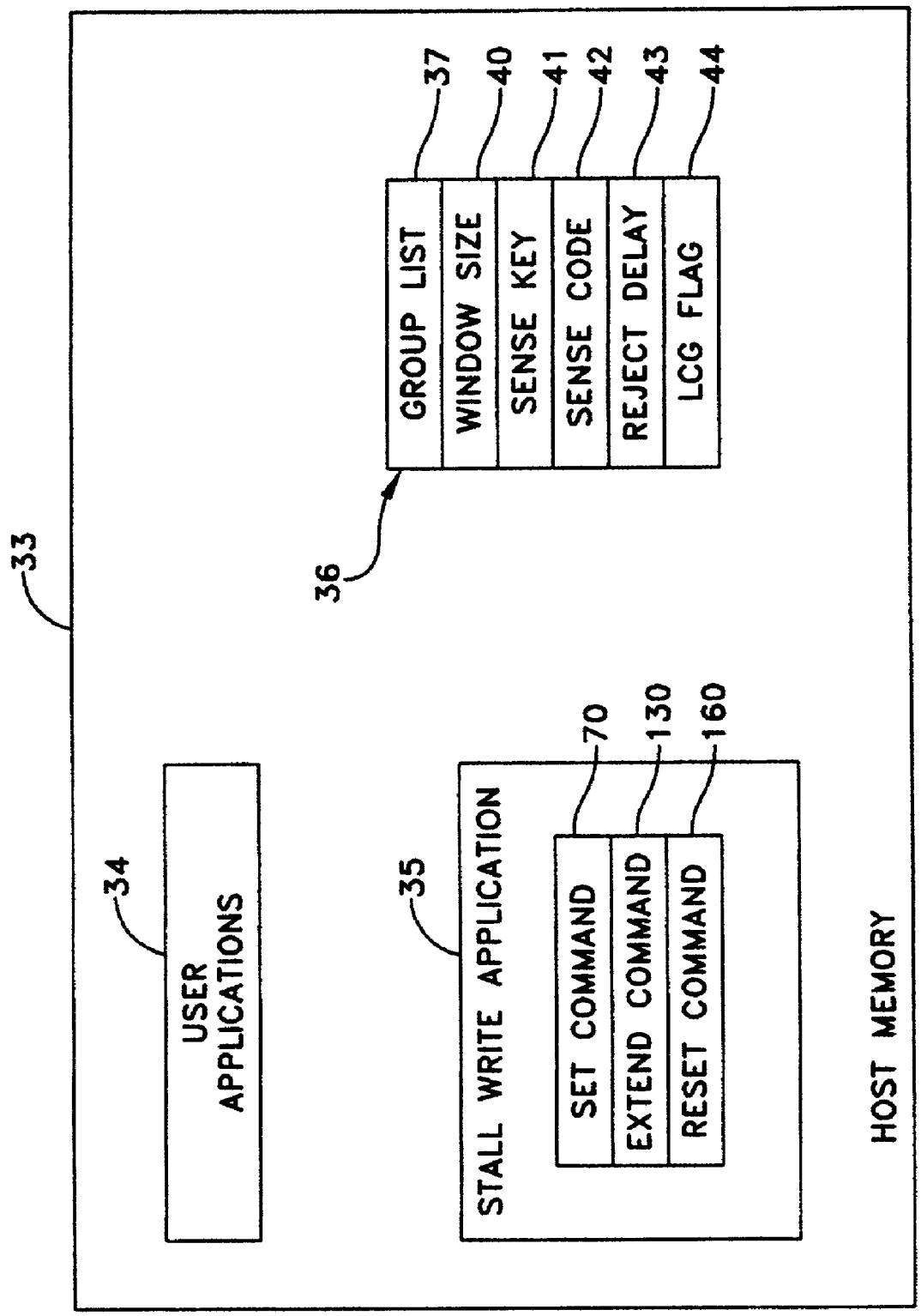
FIG. 1A depicts a memory in a host in FIG. 1.

Each host has a host memory. FIG. 1A depicts a typical host memory 33 as might be found in the host 11 or the host 12 of FIG. 1. The host memory 33 in FIG. 1A includes user or primary applications 34. The user applications are characterized by producing dependent I/O sequences.

LOCAL CONSISTENCY GROUP

In accordance with this invention, the host memory 33 in FIG. 1A also includes a stall write application 35 that operates in accordance with the parameters in a data structure 36. The stall write application 35 has the capability of issuing a number of commands, like API commands, that the host adapters, like the host adapters 17 and 25, can receive and process. A SET command is one such command.

The parameters contained in the data structure 36 include a group list 37. The group list 37 identifies each logical device to be included in a local consistency group. The list may have any form. A window size parameter 40 establishes the duration of a reject window. A sense key parameter 41 and sense code parameter 42 provide the basis for a return message that can be sent by the host adapter to a host. The structure and use of sense key and sense code parameters is generally known in the art. A reject delay parameter 43 establishes a delay between the processing of a write operation and the transmission of a message with the sense key and sense code parameters 41 and 42. An LCG flag 44 is set to indicate that a first write command after the operation should clear the local consistency group established by a SET command. The function of each parameter will be described more fully later.

Figure 1B:
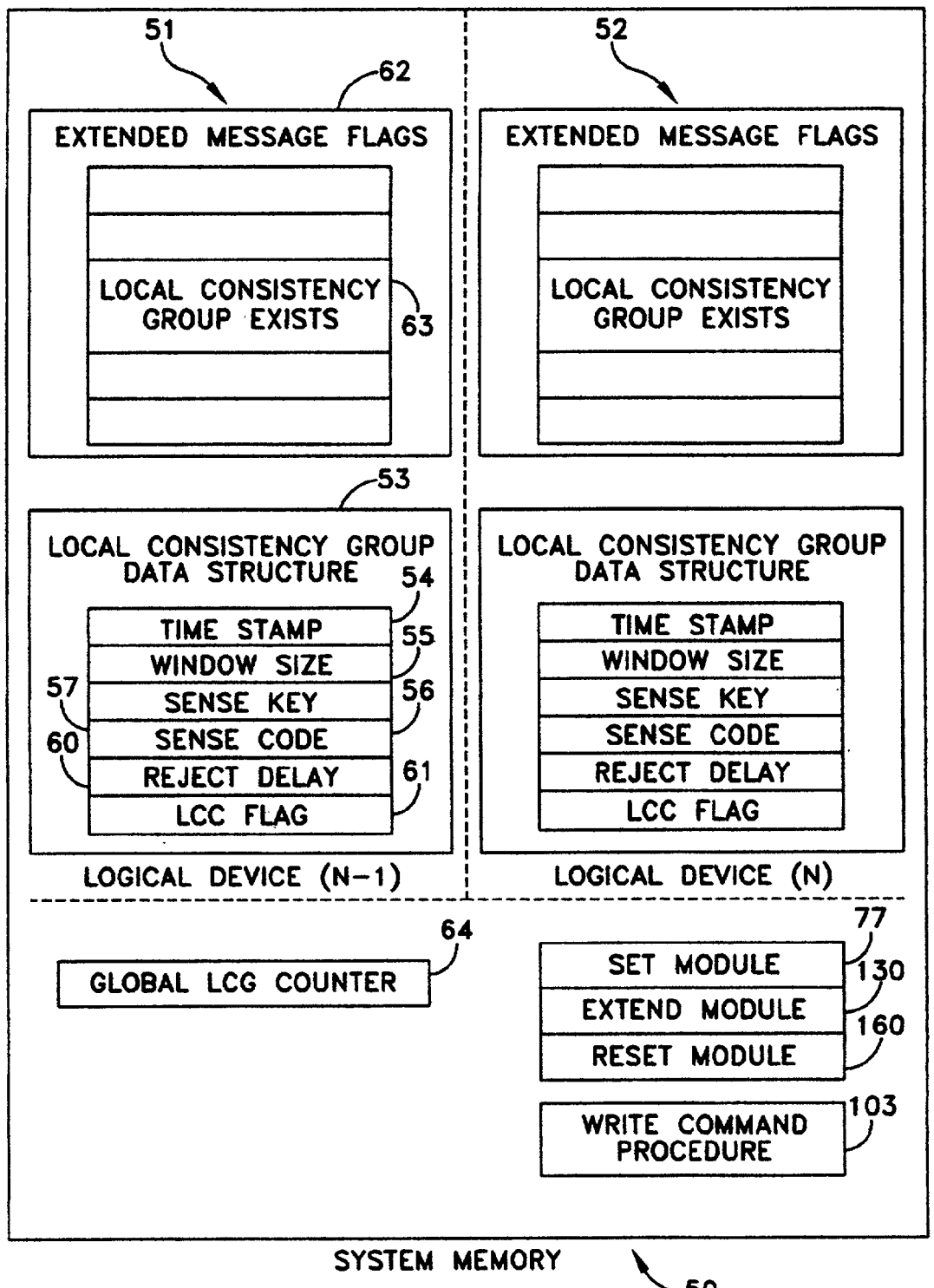
FIG. 1B depicts a system memory in a disk array storage device of FIG. 1.

When a host adapter, such as the host adapter 17 or host adapter 25 in FIG. 1, receives a SET command with the parameters shown in FIG. 1A, the host adapter establishes certain data structures within the DASD system memory, such as the system memory 20 or system memory 26. As shown in FIG. 1B, each system memory includes a global section 50 and a logical device section for each logical device. In FIG. 1B the system memory includes a logical device section 51 for Logical Device (N−1) and a logical device section 52 for Logical Device (N). Each logical device section has the same structure so only the logical device section 51 is explained in detail.

The logical device section 51 includes a local consistency group data structure 53 that has several entries. As known, some disk array storage devices include a clock. A time stamp entry 54 receives the local time of clock provided by the associated DASD when a command, such as a SET command, is received. A window size entry 55 receives the window size parameter 40 from FIG. 1A. Likewise a sense key entry 56, a sense code entry 57, a reject delay entry 60 and an LCG flag entry 61 receive the sense key parameter 41, sensed code parameter 42, reject delay parameter 43 and LCG flag 44, respectively. Each logical device section also includes extended message flags, like extended message flag 62 in Logical Device (N–1) Section 51. One entry in the extended message flags is a Local Consistency Group Exists flag, such as the flag 63.

The global section 50 includes a Global LCG counter 64. This counter identifies the number of logical devices in a DASD that are included in the defined Local Consistency Group.

One host adapter 17 in each DASD receives a SET command with the parameters shown in the data structure 36. In response, the host adapter generates a Local Consistency Group Data Structure, such as the data structure 53 shown in FIG. 1B and a Global LCG counter 64. From the receipt of the SET command until the expiration corresponding to the Window Size parameter in the entry 55 of FIG. 1B, all host adapters, such as the host adapter 17, block or stall any response to a write command. Each host adapter also returns the sense key and sense code entries 56 and 57 to the requesting host. Generally the requesting host processes this message and retries the write operation. Retries continue, with certain restraints, until the reject window closes. Thus in response to the SET command each host adapter establishes a plurality of logical devices as a consistency group with a reject window having a predetermined duration established by the window size parameter 55. This reject window opens when the SET command is received and ends at a time calculated by combining the values in the time stamp entry 54 and window size entry 55. Although responses to write commands to logical devices in the defined consistency group are blocked while the reject window is open, write operations are not blocked to logical devices outside the local consistency group. Moreover, read requests are not blocked to any logical device. When a block does occur, the host may retry the write operation.

DETAILED DESCRIPTION

Figure 2:
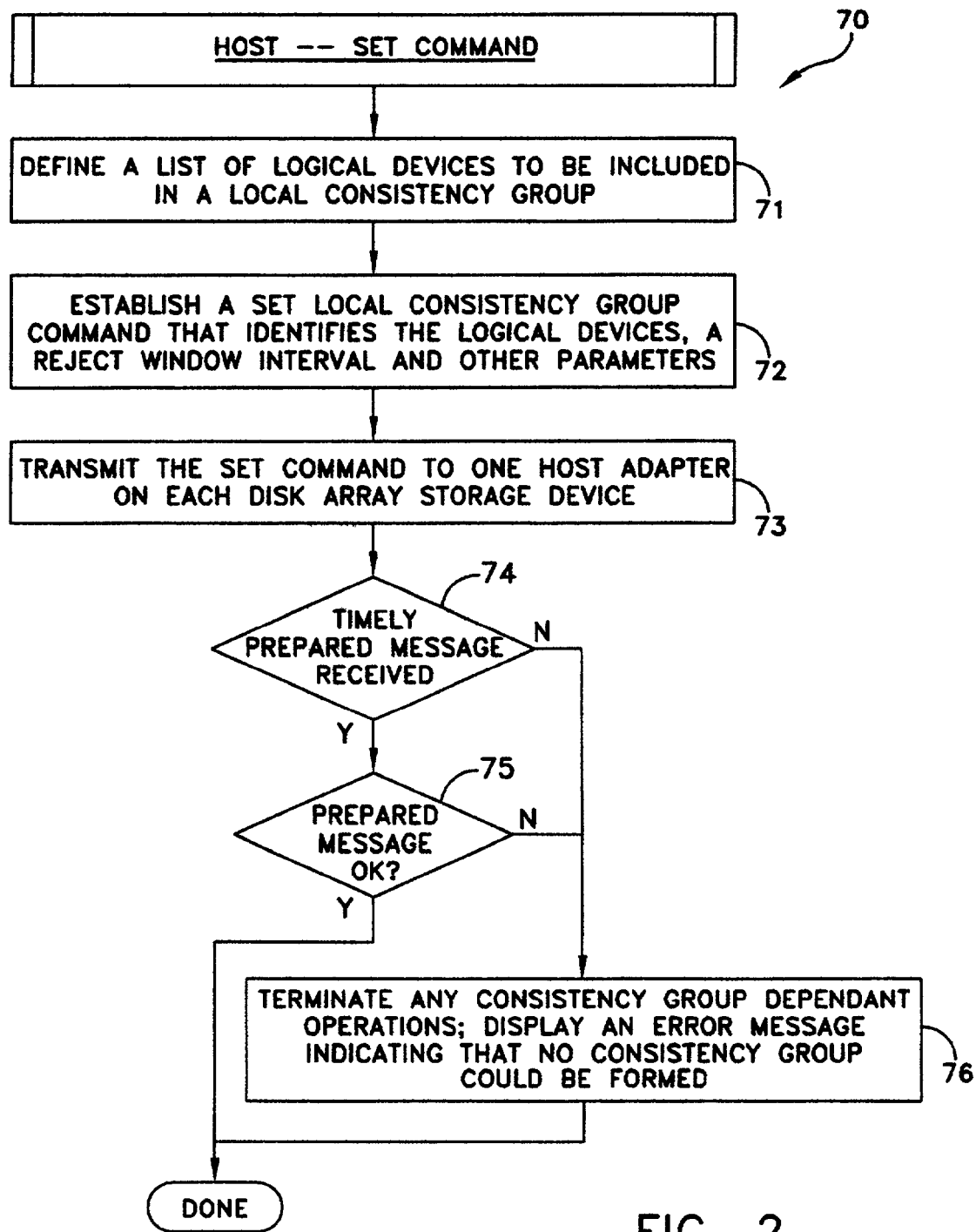
FIG. 2 is a flow diagram depicting operations in a host computer in response to a SET command.

With this as background, a stall write application 35 in host memory includes modules associated with different commands to produce a number of operating sequences in both the host and in a host adapter that receives a command. The first command is the SET command. The SET command establishes a data structure, such as the data structure 36 shown in FIG. 1A. As shown in FIGS. 1A and 2, a SET command module 70 processes the SET command. As an initial step, the SET command module 70 defines a list of the logical devices to be included in a local consistency group in step 71 in FIG. 2.

Assume for example, that the logical devices in DASD 15 and DASD 16 are designated as standard logical devices "0" through "100" and that it is desired to use the data in the corresponding BCV devices corresponding to standard logical devices 0 through 5, 25 through 40 and 75 through 80 with an ancillary application. The defined list of logical devices obtained in 71 then will identify those specific standard logical devices. In one specific embodiment, the Group List syntax could be [0–5, 25–40, 75–80] wherein each group of consecutively numbered standard logical devices constitutes a "run" (e.g. 0–5); this list comprises three runs. Step 72 establishes a command that incorporates the list of logical devices to be included in the local consistency group and other parameters such as the reject window or window size parameter 40, the sense key and sense code parameters 41 and 42, a reject delay parameter 43 and the LCG flag 44. Step 73 transmits that SET command onto the bus 14.

The host adapter that receives the SET command generates a status message that indicates the success or non-success of the SET command. If the host receives a status message from each DASD in a timely fashion, step 74 transfers control to step 75 that determines whether all the received messages indicate success. If they do, the host response to the SET command is complete. If either of the tests in step 74 or step 75 fails, control transfers to step 76. Step 76 terminates any consistency group dependent operations and displays an error message indicating that no consistency group could be formed. Step 76 may, for example, generate a reset command, described later.

Figure 3A:
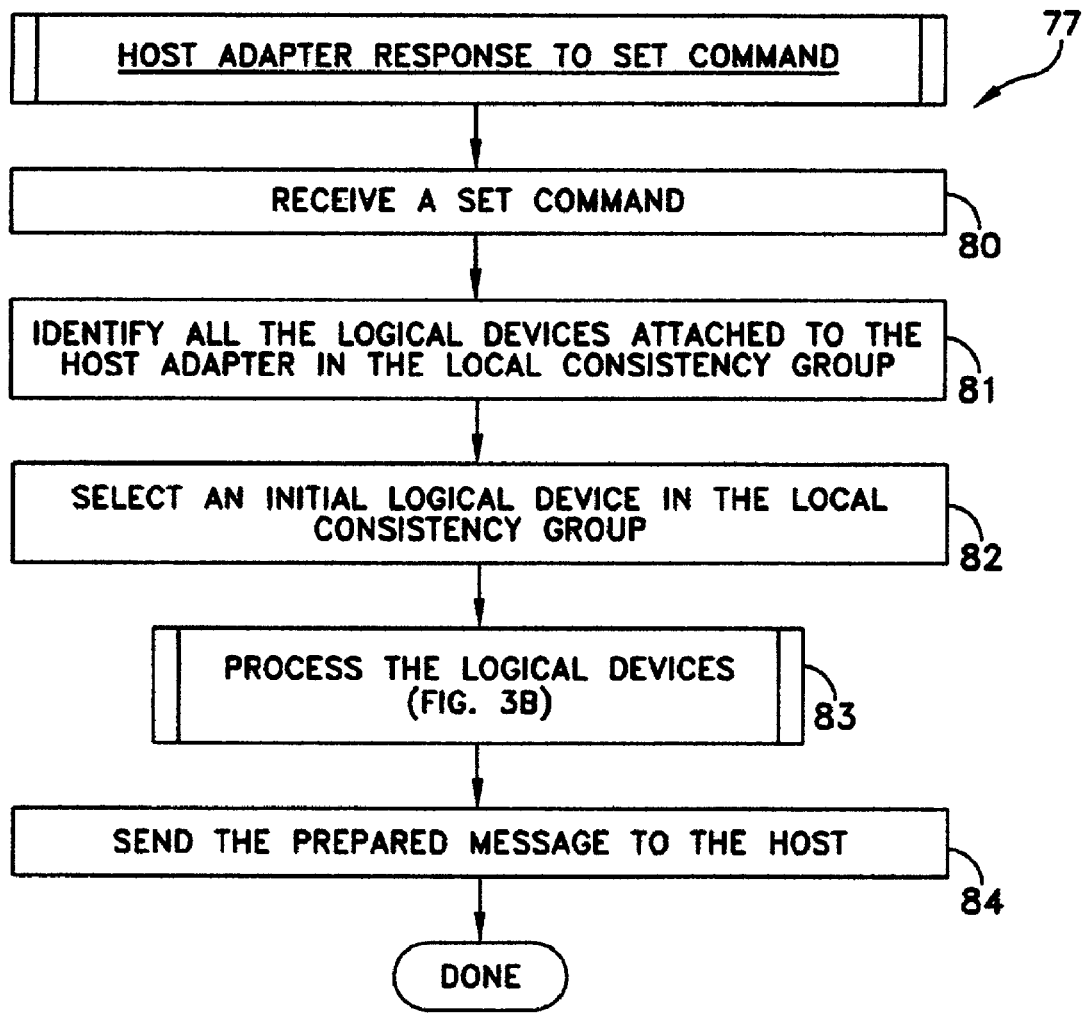
FIGS. 3A and 3B depict a response to the SET command in a disk array storage device.
Figure 3B:
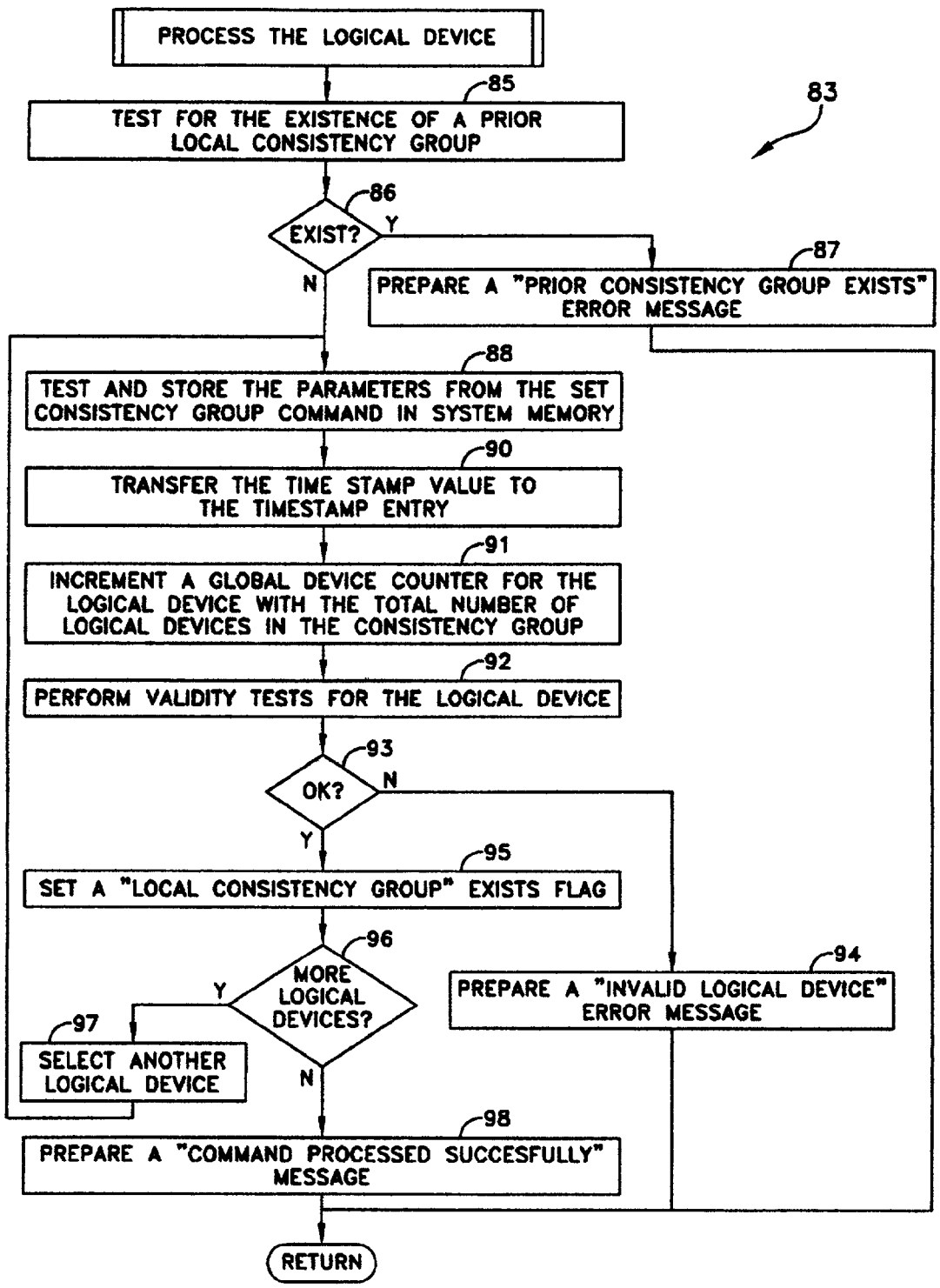

When step 73 in FIG. 2 transmits the SET command to one host adapter on each disk array storage device, a host adapter, such as the host adapter 17, responds by processing a SET module 77 shown in FIG. 1B and discussed in detail with respect to FIGS. 3A and 3B. Specifically, step 80 in FIG. 3A represents the receipt of the SET command. In step 81 the host adapter parses the SET command, particularly the group list parameter, to identify all the logical devices attached to the host adapter in the local consistency group. Step 82 selects an initial logical device in the local consistency group that is attached to the host adapter. A procedure 83 shown in FIG. 3B processes this initial logical device and each logical device in the DASD and the local consistency group. When procedure 83 ends, step 84 returns a message to the host; the message is dependent on the operations within the procedure 83.

Referring now to FIG. 3B, step 85 is a first step in the procedure 83 that tests for the existence of a prior local consistency group. Specifically step 85 examines the Local Consistent Group Exists flag, such as the flag 63 corresponding to logical device (N–1) in FIG. 1B. If the flag is set, a prior local consistency group exists. Step 86 transfers control to step 87 that prepares a "Prior Consistency Group Exists" error message. Control passes back to step 84 in FIG. 3A to transfer this error message back to the host.

If no prior consistency group exists, step 86 transfers control to step 88 that tests the parameters from the SET command. If they are acceptable, step 88 stores them in the system memory. For example, if the SET command identifies a logical device (N–1), step 88 stores parameters shown in the local consistency group data structure 53. Step 90 sets and records the local time of the disk array storage device. Step 91 increments a Global LCG counter, such as counter 64 in FIG. 1B. On successful completion of the procedure 83, the Global LCG counter 64 identifies the total number of logical devices for that disk array storage device that are in the local consistency group.

Step 92 performs various validity tests on the logical device to assure its proper operation. For example, each logical device number and configuration information for a DASD identifies a maximum number of logical devices. These validity tests could assure that the logical device number was within the range of allowed device numbers as established by the configuration information. Still other tests will be performed.

If those tests are not successful, step 93 transfers control to step 94 that prepares an Invalid Logical Device error message. Control then transfers to step 84 in FIG. 3A. Otherwise, step 93 transfers control to step 95 that sets the Local Consistency Group Exists flag, such as the flag 63 in FIG. 1B for logical device (N–1). If more logical devices exist, step 96 transfers control to step 97 that selects another logical device in the disk array storage device. Then control transfers back to step 88.

If all the logical devices are processed successfully, step 96 transfers control to step 98. Step 98 prepares a "Command Processed Successfully" message. Control then transfers back to step 84 in FIG. 3A.

Figure 4:
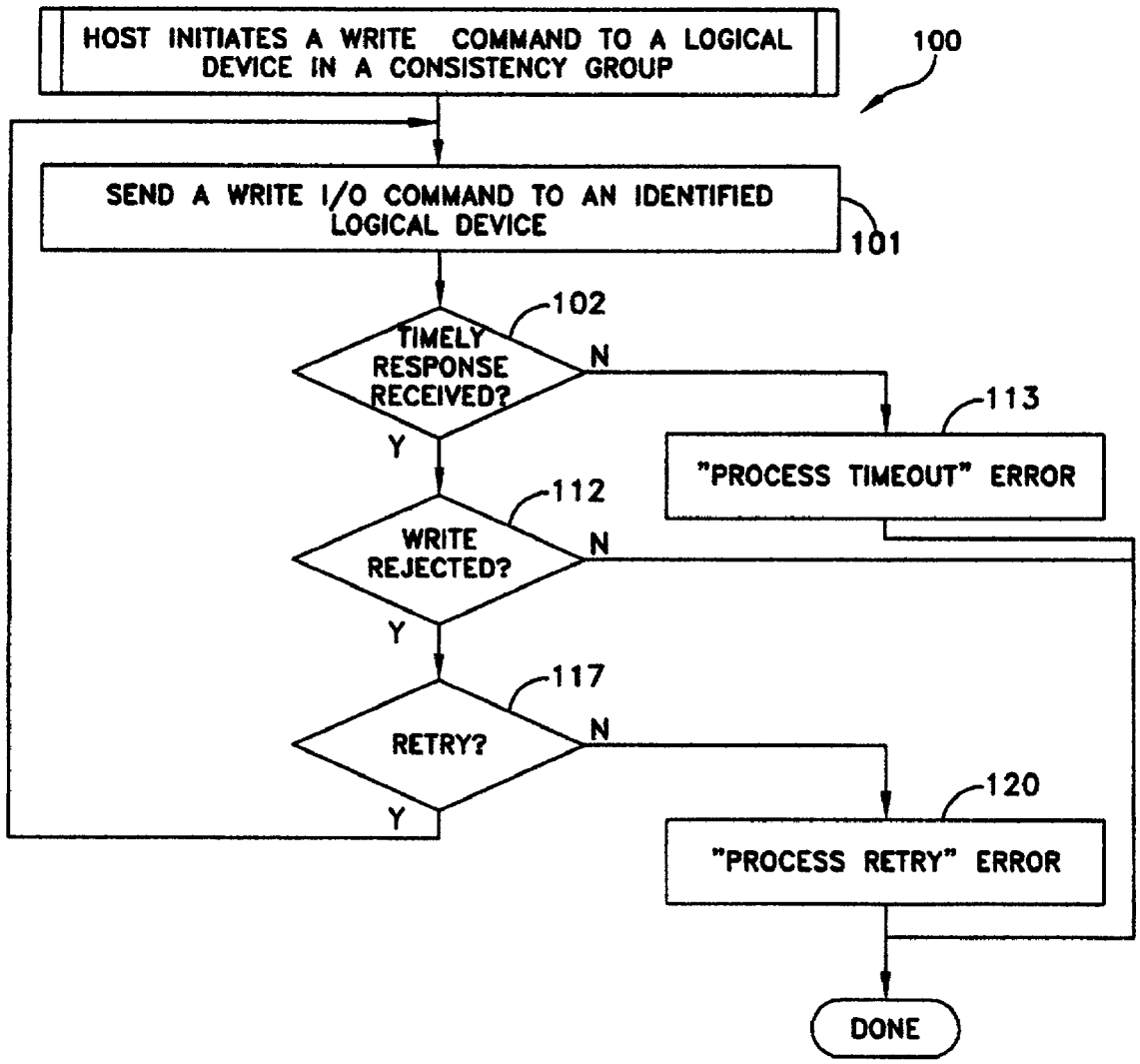
FIG. 4 is a flow diagram that depicts the operation of a host to a write command.

After the SET command is sent, because no lock is placed on input/output operations, any host can initiate and generate a write command to a logical device in the local consistency group as represented by procedure 100 in FIG. 4. Step 101 represents the process by which a write command is sent to an identified logical device. The host then waits for a timely response in step 102. When a host adapter receives a write command, it initiates a write command procedure 103 shown in FIG. 1B and detailed in FIG. 5. Step 104 represents the receipt of the write command. As a first operation the host adapter checks the Local Consistency Group Exists flag, such as flag 63 in FIG. 1B, for determining the existence of a local consistency group. If one of those flags does not exist, no additional processing in accordance with this invention is necessary. Control transfers to step 107 that performs the write operation after which the host prepares a Successful Write Operation message in step 110. The host adapter then transfers the prepared message back to the host in step 111.

Referring again to FIG. 4, in that case and assuming that the Successful Write Operation message is received in a timely fashion, step 102 transfers control to step 112. In this situation, the write command was not rejected by the host adapter. Consequently, step 112 considers the operation to be done because the write command was successful.

Returning to FIG. 5, if the corresponding local consistency group exists, its corresponding flag is set. Step 106 transfers control to step 114 to determine whether the write command was received within a reject window; that is, during an open state of the reject window. When a disk array storage facility includes a clock, step 114 essentially compares the clock time to determine if it is within the window that starts of the time of the time stamp entry 54 and extends for an interval determined by the window size entry 55 in FIG. 1B. If the write command is received during this open state of the reject window, step 114 tranfers to step 115. Step 115 determines whether a delay corresponding to a value in the reject delay entry 60 has elapsed. The delay in the reject window can be any value greater than or equal to zero. If the reject delay has elapsed, control transfers to step 116 that prepares a Retry Write message. This message indicates the write command was rejected because it was received during a reject window. In one embodiment this Retry Write message utilizes the information stored in the sense key and sense code entries 56 and 57 of FIG. 1B.

When this message is received in the host, step 112 in FIG. 4 transfers control to step 117 that determines whether another retry should be attempted. Typically, a host identifies a maximum number of permitted retry operations. If step 117 allows another retry, control transfers back to step 101 to send the write command again. Otherwise step 117 transfers control to step 120 that prepares a Process Retry error message. The host responds to such a message with appropriate recovery or diagnostics sequences.

Referring again to FIG. 5, whenever a first or subsequent write command is received after the reject window closes, that is when the DASD clock provides a time that is later than the time obtained by combining the values in time stamp entry 54 and the window size entry 55, control transfers to step 121. Step 121 determines whether the data structure should be cleared by examining the corresponding LCG flag, such as the LCG flag 61. If that flag is set, the response to the write command step 122 clears the corresponding data structure, such as data structure 53. In either case the control transfers to step 107 to perform the write operation and return a Successful Write Operation message. Obviously if an error occurs during a normal write operation, an error message would be produced; it is not shown for purposes of clarity.

A further understanding of the operation and advantages can be attained by reviewing conventional operations and operations in accordance with this invention while a reject window is open. In accordance with certain objectives of this invention, the stall write application assures data consistency, particularly in connection with write commands involved with dependent I/O sequences. Assume that primary applications are interacting with the standard devices and that BCV devices are attached to each standard device and are in synchronism with those devices. Assume further that it desired to split a number of logical devices from their respected standard devices, for some ancillary application, such as a backup application. First, a host, as a requesting host, issues the SET command identifying those logical devices and then issues the split command.

Without this invention or other type of consistency methodology, the dependent I/O sequences can produce corrupted data because each command to a split or detach a BCV device is sent independently to each logical device. Consequently, different host adapters will not process the command simultaneously. When a dependent I/O sequence occurs, first write-to-write-log, write-to-data and a second write-to-write-log operations occur in sequence. The write-to-data and second write-to-write-log operations require the completion of the prior operation or operations. When this sequence occurs, even during a splitting operation, the standard devices will properly record the information. However, the transfer of this information to the BCV devices may or may not occur prior to the process of detaching the BCV devices as previously described.

This invention only blocks write commands to each logical device in a defined local consistency group. Primary applications can continue to read data from all the standard devices. Updates to standard devices continue to transfer to BCV devices that are not in the deferred local consistency group. Moreover even when a write command to a device in the defined local consistency group is blocked, a return message identifies a stall write condition so the host automatically retries the write command. This retry process continues until either a maximum number retries has been reached or the reject window returns to a closed state. When the reject window returns to a closed state, the next attempt to process the write command is successful.

In many mixes of read and write operations, merely blocking selected write commands for a few seconds is acceptable. Moreover, data consistency exists for dependent I/O sequences because the second or third write commands in a sequence can not occur until the first and second write commands, respectively, are successfully, processed.

Figure 5:
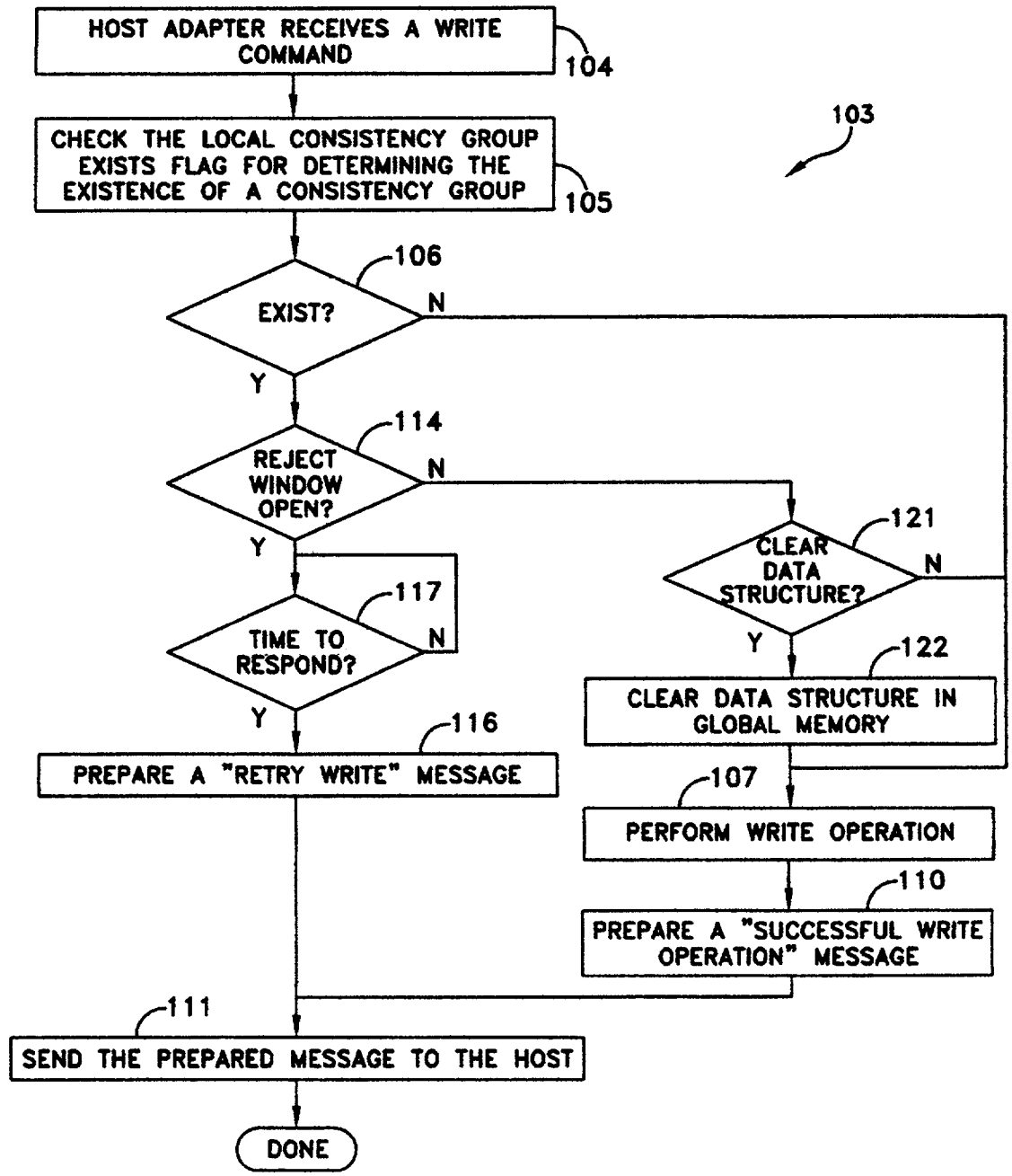
FIG. 5 is a flow diagram that depicts the operation in a disk array storage device in response to a write operation.

Referring specifically to FIGS. 4 and 5, the host generates a SET command and a subsequent write command to a logical device in a local consistency group. The write command is not blocked at the host, but is sent to a host adapter. If a consistency group exists, step 114 determines whether the write operation is occuring while the reject window is in an open state. If it is, step 116 prepares the Retry Write message for return to the host in step 111. If that message is received in sufficient time, as defined by step 102, and if the retry maximum has not reached, the same write command is again sent to the same logical device. Once the write command received after the reject window is closes, the host adapter 121 eventually performs the write operation and signals the successful completion.

Consider a situation in which a host sends first write-to-log command to a logical device and that host, or another host, issues a SET command. When the host sends the write-to-data command as the second command in the dependent I/O sequence, it is likely to coincide with the open state for the reject window. Thus the write-to-data command can not be processed until after the reject window returns to its closed state, so it can not transfer to the standard device or its corresponding BCV device. If the BCV devices are then split, they will only contain the first write-to-log command. Consequently, any application using the data on the BCV devices will "know" that this operation is incomplete.

As previously indicated and shown in FIG. 1A, a SET command includes a reject delay parameter 43 with a value greater than or equal to 0. This value defines the time that elapses between the receipt of a write command and the transmission of a "Retry Write" message at step 116 in FIG. 5. More specifically, if the reject delay parameter is zero, step 115 in FIG. 5 introduces no delay. Steps 116 and 111 send the "Retry Write" message back to the host immediately. In such situations there is a minimal delay until the host retries the write operation so the retry rate is high. In some systems such a high retry rate may cause a retry counter to reach a maximum value so step 117 in FIG. 4 encounters a Process Retry error. In other systems the added load introduced by write retries conducted at a high retry rate may introduce an unacceptable load on system resources.

If, however, the reject delay parameter is set to a greater value, such as one second, step 115 in FIG. 5 delays the transmission of the "Retry Write" message for that one-second interval. As will be apparent, any value above zero will significantly reduce the rate at which the host retries to write data to the blocked logical device. Generally speaking, some systems will benefit from delays; others will not. When a non-zero value is used, the actual value should be less than time interval established by step 102 in FIG. 4 to avoid a Process Timeout error message.

Figure 6A:
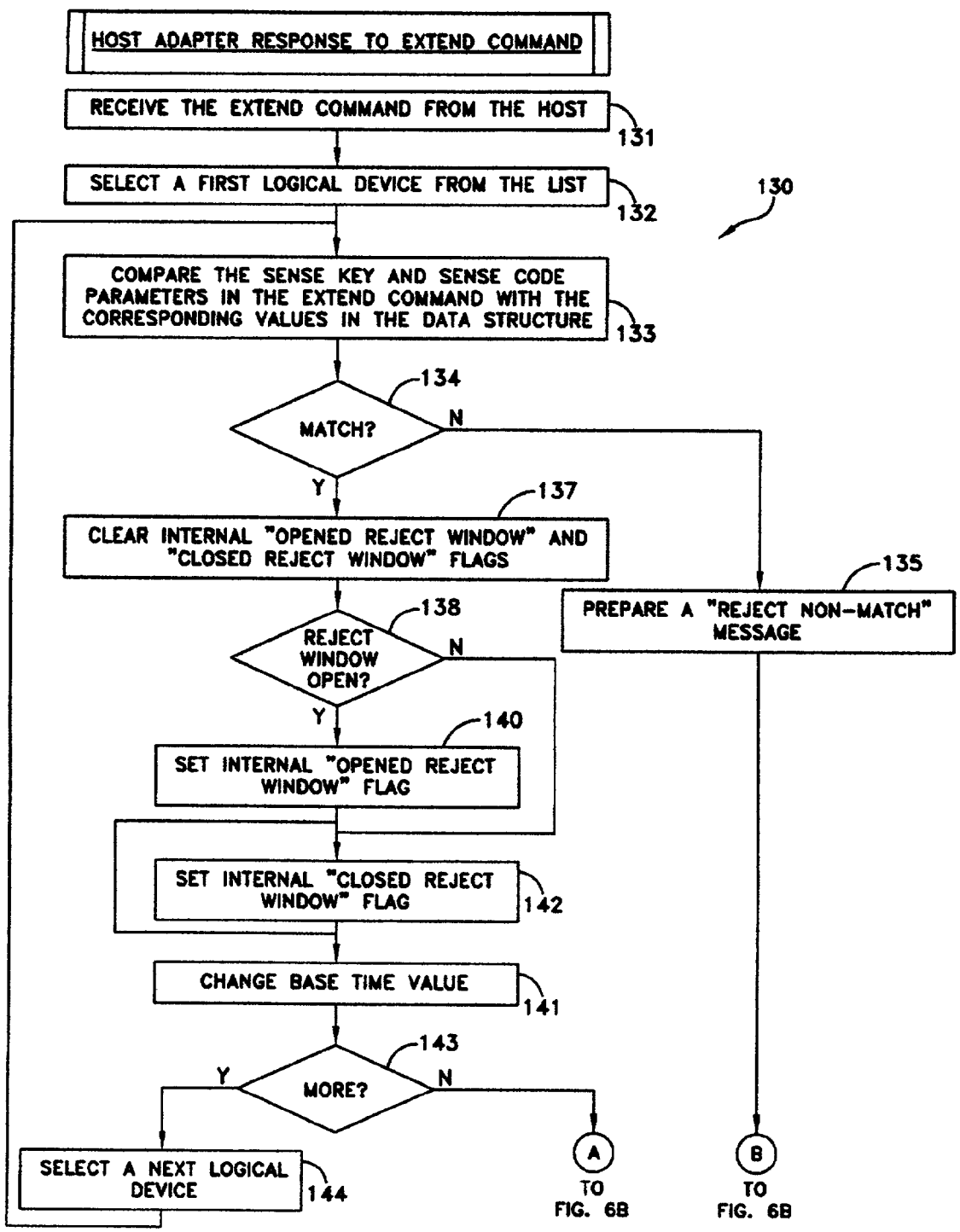
FIGS. 6A and 6B constitute a flow diagram that depicts the response of a disk array storage device to an EXTEND command.

As will be apparent, it is possible that the window size parameter in a SET command will open a reject window for too short a time. Disk array storage devices also include monitoring systems that can detect such a situation. In a number of situations where the window size is underestimated, an EXTEND command can increase the time the reject window remains in the open state. In one embodiment, a host adapter processing module 130 shown in FIG. 1A and in detail in FIGS. 6A and 6B performs this function. Referring to FIG. 6A, step 131 represents the receipt of the EXTEND command from the host and step 132, the selection of a first logical device from the group list. Step 133 compares the sense key and sense code parameters 41 and 42 of FIG. 1A in the EXTEND command and the values stored in the corresponding local consistency group data structure, such as the sense key and sense code entries 56 and 57 for logical device (N-1) in FIG. 1B. This comparison assures that the EXTEND command does not alter the sense key and sense code sent back in response to a blocked write operation. If no match exists, step 134 transfers control to steps 135 and 136 in FIG. 6B to prepare a Reject Non-Match error message for transmission back to the host. The host responds to this message and terminates further operations, as by generating a RESET command described later.

If a match exists, step 134 in FIG. 6A transfers control to step 137 that clears internal Opened Reject Window and Closed Reject Window flags. Step 138 compares the time at the selected logical device and the interval established by the time stamp and window size entries in the corresponding data structure. If the reject window is in its open state, step 140 sets the internal Opened Reject Window flag. Then step 141 changes the value in the time stamp entry 54 to reflect the current time provided by the disk array storage device containing the logical device. Now the window will remain open for an additional interval using the original window size value. If the reject window is in its closed state, step 138 transfers control to step 142 that sets the internal Closed Reject Window flag and again changes the base time value in step 141.

Figure 6B:
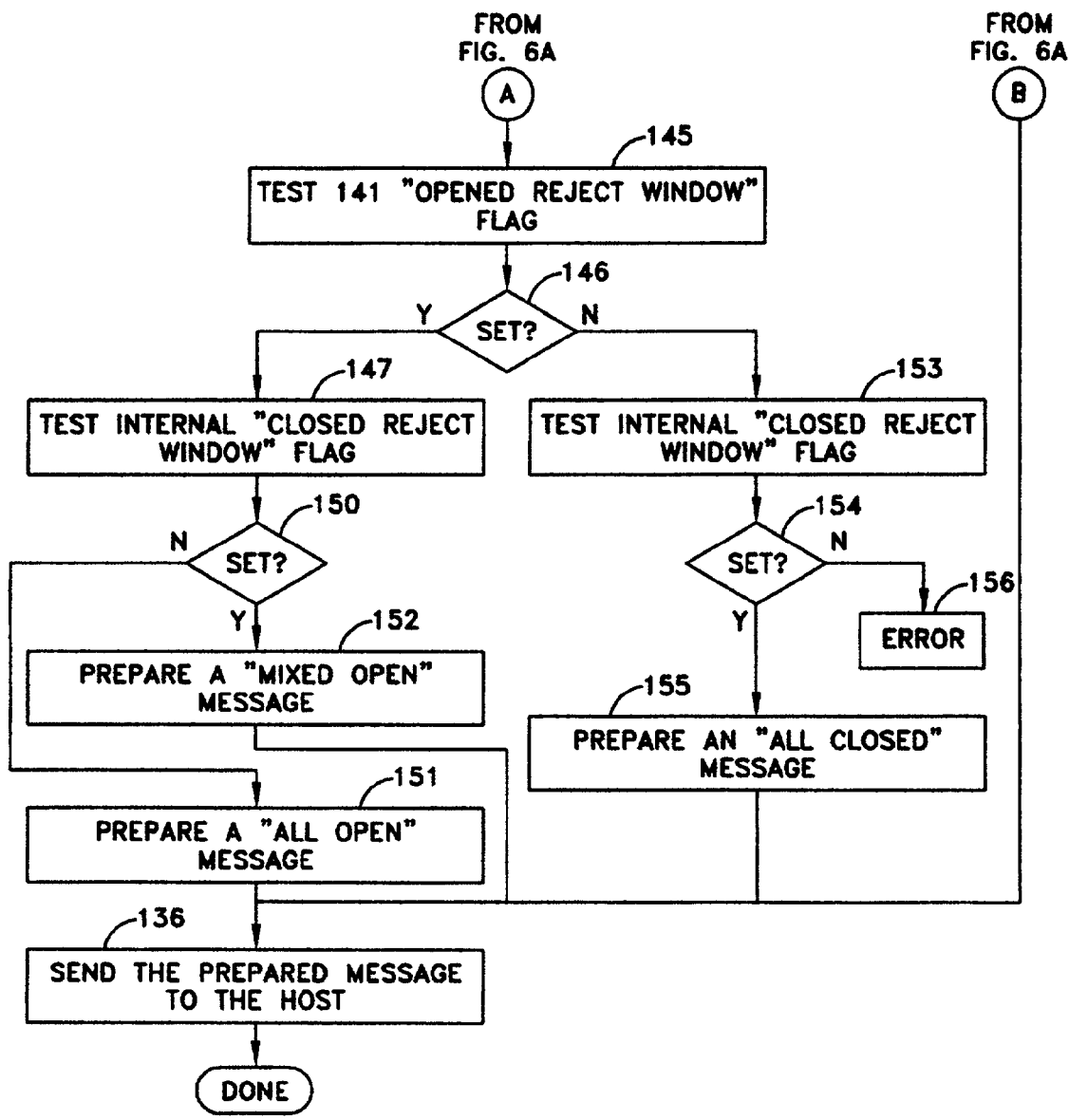

Steps 143 and 144 provide a loop control and logical device selection to assure that steps 133 through 142 process each logical device in the disk array storage device and on the list in the SET command. After all the logical devices have been selected, either or both of the Opened Reject Window and Closed Reject Window flags may be set. Step 145 in FIG. 6B is an initial step in analyzing these internal flags to determine whether the reject windows associated with the logical devices were all opened, or all closed or whether some of the reject windows were opened and closed. Step 145 tests the Opened Reject Window flag. If it is set, the reject window in at least one logical device was in the open state at the time the EXTEND command was processed. Step 146 therefore transfers control to step 147 to test the internal Closed Reject Window flag. If that flag is not set, then the reject windows in all the logical devices were opened. Step 150 transfers control to step 151 that prepares an All Open message for transmission back to the host in step 136. If the internal Closed Reject Window flag is set, then the reject windows in some logical devices were in the open state and others were in the closed state. Control passes then to step 152 to prepare a "Mixed Open" message for transmission back to the host in step 136.

If the internal Opened Reject Window flag is reset, then all the reject windows in all the logical devices were closed. To verify this, step 153 in FIG. 6B tests the internal Closed Reject Window flag. Step 154 should transfer control to step 155 to prepare an "All Closed" message for transmission back to the host in step 136. If the internal Closed Reject Window flag were cleared, an error condition would exist for handling in step 156. The systems and procedures for handling such errors are well known in the art.

Thus, in accordance with this aspect of the invention, the procedure 130 shown in FIGS. 6A and 6B allows a an extension of the time by updating the time stamp value in the entry for each logical device data structure the logical consistency group data structure.

Figure 7A:
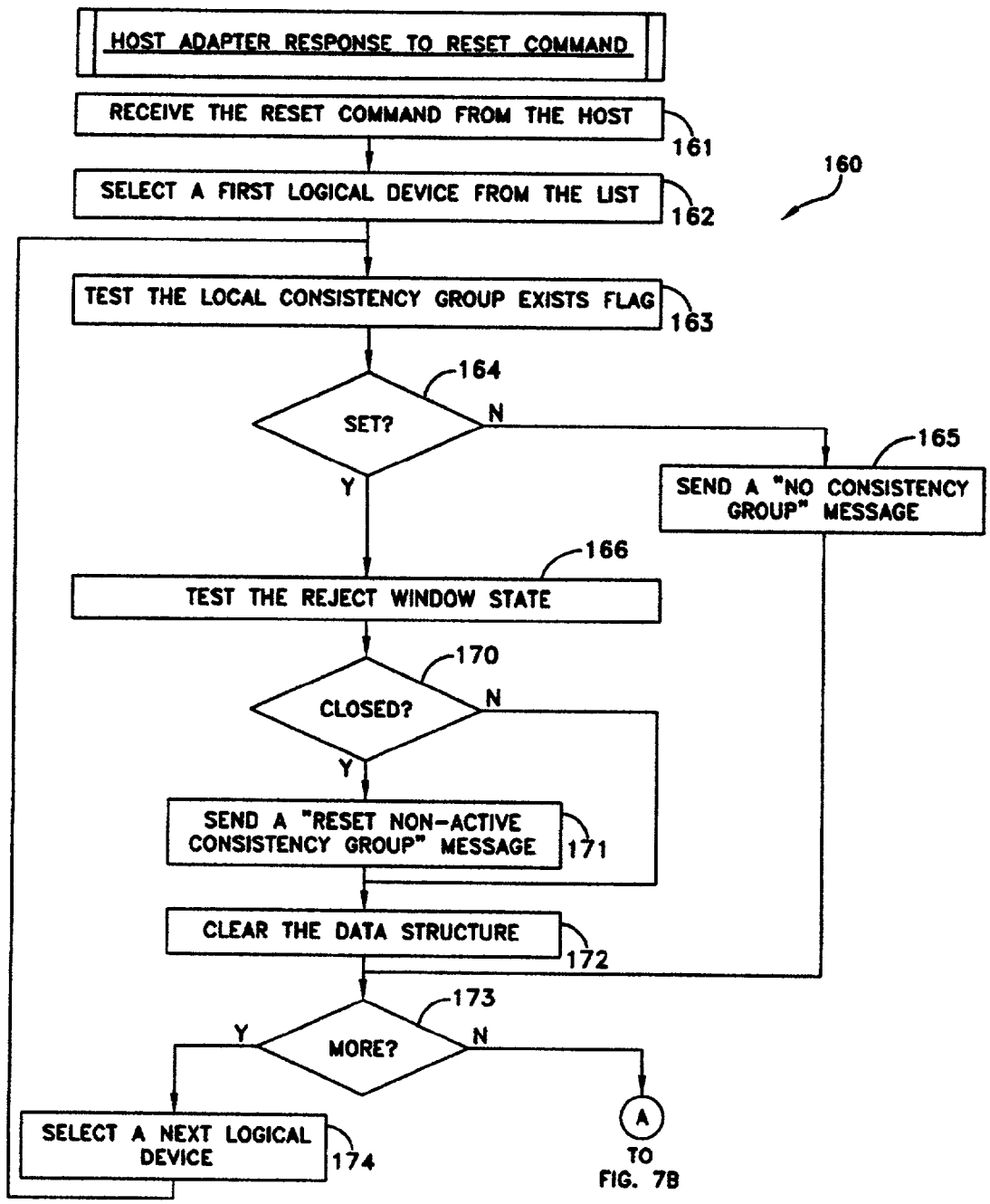
FIGS. 7A and 7B constitute a flow diagram that depicts the response of a disk array storage device to a RESET command.
Figure 7B:
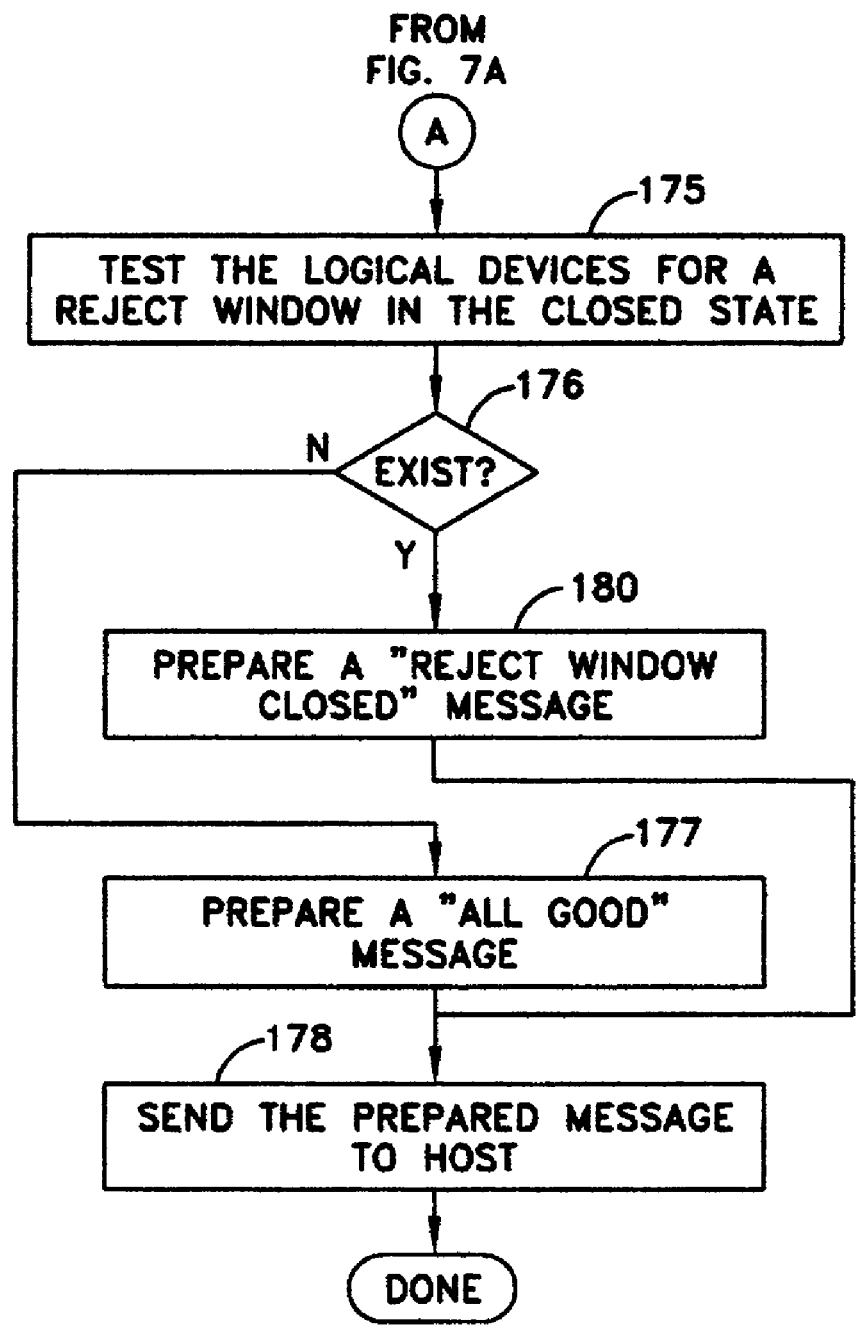

A stall write application may also include a RESET command that directs a reset module 160 shown in FIG. 1A and in detail in FIGS. 7A and 7B to terminate a local consistency group immediately. Generating such a RESET command could be an option invoked by step 76 in FIG. 2 as part of a termination of local consistency group dependent operations. A RESET command may also be part of other error recovery schemes. A RESET command following the closure of a reject window provides an express or directed clearing of all related data structures. In essence, when a host generates a RESET command, it positively clears the data structures in the system memory associated with each logical device such in as shown in FIG. 1B as opposed to waiting for a write command to a logical device after a reject window closes when the LCG flag is set. The RESET command and a Reset Module 160 in FIGS. 1A, 7A and 7B clear all the data structures for all the logical devices.

As shown in FIGS. 7A and 7B, the reset procedure 160 begins with the receipt of the RESET command from the host in step 161 and the selection of a first logical device from the list in step 162. Step 163 test the Local Consistency Group Exists flag for the logical device. For example, if logical device (N−1) in FIG. 1B is selected, step 163 test the logical consistency group exist flag 63. If it is not set, there is no logical consistency group, hence there is no need to reset the group. So step 164 transfers control to step 165 to send a "No Consistency Group" message. This message indicates that there is a conflict between the logical devices identified in the list and the existence of a logical consistency group.

If the Local Consistency Group Exists flag is set, step 164 in FIG. 7A transfers control to step 166 that tests the reject window state. This test is performed by comparing the time at the logical device with the time obtained by combining the values in the time stamp and window size entries. If the reject window is in its closed state, control transfers to step 171 to prepare and send a "Reset Non-Active Consistency Group" message before the data structure is cleared in step 172. If the reject window is still in its open state, step 170 bypasses step 171 and clears the data structure in step 172 without sending any message back to the host.

Steps 164 through 172 define three paths or three different procedures. When any of those is finished, control transfers to step 173 to assure that all the local logical devices in the local consistent group have been reset. If another exists, control passes through step 174 to select a next logical device to step 163. As the loop comprising steps 163 through 174 tests each logical device in a local consistency group, any unusual states merely generate a corresponding message. The procedure 160 does not abort. However, each message defines abnormalities that may exist in the data for subsequent analysis.

When all the logical devices have been processed in accordance with FIG. 7A, step 173 transfers control to step 175 in FIG. 7B. If all the reject windows were in their open states at the time of the RESET command, step 176 transfers control to step 177 that prepares an "All Good" message. Step 178 then sends that prepared message to the host. If, however, one of the logical devices was characterized by a reject window in its closed state, step 176 passes control to 180 that prepares a "Reject Window Closed" message that is sent to the host with step 178. Consequently, if host receives a "Reject Window Closed" message, the host can initiate appropriate recovery procedures.

Thus, in accordance with this invention, procedures are provided that facilitate and provide a simple method and apparatus for assuring data consistency in BCV and like devices made as copies in information in standard devices, particularly during dependent I/O sequences. This is readily accomplished by blocking only write operations to logical devices in a local consistency group; that is, only to those logical devices that contain related data such as database data and log files. The process is transparent to a user and will minimize any interruption to normal processing activities between a user application program and data in a disk array storage device. More specifically, this invention does not require the termination of all read/write operations during a splitting or like operation of BCV devices from standard devices or equivalent operations in other disk array storage devices.

This invention has been described in terms of a specific disk array storage device with well-known characteristics and in terms of specific procedures for implementing the invention in that disk array storage device. The exact step sequence illustrated in each of those procedures is shown by way of example. Alternative sequences could be substituted, particularly in adapting this invention to other types of disk array storage devices. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for maintaining data consistency in a group of logical devices formed in a disk storage system wherein each logical device responds to read and write commands issued from a host by performing a commanded operation and by transferring a message to the host indicating the outcome of the commanded operation, said method comprising the steps of:

A) establishing a plurality of the logical devices as a local consistency group with a reject window having an open state that extends for a predetermined interval and a closed state, B) blocking, at a control for each logical device, only the processing of a write command directed to a logical device in the defined consistency group while the reject window is in the open state whereby commanded read operations to each logical device in the consistency group are processed even when the reject window is in an open state, and C) in response to said blocking and receipt of a write command, generating a predetermined return message to the host indicating a blocked write command for a response thereto.

2. A method as recited in claim 1 wherein the host generates a setting command with a list of logical devices to be included in the local consistency group and a window size parameter that establishes the interval that the reject window is in its open state, said establishing of the local consistency group including defining the open state interval for each logical device in the local consistency group.

3. A method as recited in claim 2 wherein each logical device is associated with time clock and said establishing includes recording, for each logical device, the time defined by the time clock associated with that logical device.

4. A method as recited in claim 3 wherein said blocking of a write command to a logical device with local consistency group determines whether the time defined by the associated time clock at the time of the write command is concurrent with the open state of the reject window.

5. A method as recited in claim 3 wherein said establishment includes generating a data structure for each logical device in the local consistency group including a time stamp entry for receiving the time from the time clock associated with the corresponding logical device and a window size entry for receiving the window size.

6. A method as recited in claim 5 wherein in response to a write command to a logical device said blocking determines whether the time defined by the associated time clock at the time the write command is received is less than the time obtained by combining the time stamp and window size entries for the logical device identified in the write command.

7. A method as recited in claim 3 wherein the host generates an extension command with a list of logical devices included in the local consistency group, said method including the step responding to the extension command by replacing the recorded time for each logical device with the time defined by the time clock associated with that logical device when the extension command is processed for that logical device.

8. A method as recited in claim 2 wherein said establishment includes generating a data structure for each logical device in the local consistency group including a first flag for controlling the removal of the generated data structure, said method comprising removing the data structure for a logical device upon receipt of a write command to that logical device after the reject window returns to the closed state and in response to the state of the first flag.

9. A method as recited in claim 2 wherein said establishment includes generating a data structure for each logical device in the local consistency group and wherein the host generates a resetting command, said method additionally comprising the step of removing the data structures for all the logical devices in the local consistency group in response to the resetting command.

10. A method as recited in claim 9 wherein said removal step includes generating a message for transfer to the host for each logical device in which the reject window is in a closed state when the resetting command is processed for the corresponding logical device.

11. A method as recited in claim 10 wherein each logical device data structure includes a flag having a first state and a second state indicating that the logical device is a member of the local consistency group, said removal step including the step of generating a message when the flag is in the first state.

12. A method as recited in claim 2 wherein the setting command additionally includes a specific return message parameter that is returned as the predetermined message, the host being responsive to the message by issuing the write command again, said establishment including the step of generating a data structure for each logical device in the local consistency group including an entry for the specific return message to be sent when a write command is blocked.

13. A method as recited in claim 12 wherein the setting command additionally includes a reject delay parameter and said establishing includes the step storing the reject delay parameter in the data structure for each logical device in the local consistency group, said method additionally including the step of determining a delay between said blocking and said return message generation in response to said delay parameter.

14. A method as recited in claim 12 wherein the setting command additionally includes a reject delay parameter corresponding to a reject delay time interval and said establishing includes the step storing the reject delay parameter in the data structure for each logical device in the local consistency group, said method additionally including the step of delaying said return message generation until an interval corresponding to the reject delay time after said blocking of a write command.

15. A system for maintaining data consistency in a group of logical devices formed in a disk storage system wherein each logical device responds to read and write commands issued from a host by performing a commanded operation and by transferring a message to the host indicating the outcome of the commanded operation, said system comprising:

A) means for establishing a plurality of the logical devices as a local consistency group with a reject window having an open state that extends for a predetermined interval and a closed state, B) means for blocking, at a control for each logical device, in the defined consistency group, only the processing of a write command to a logical device in the defined consistency group while the reject window is in the open state whereby commanded read operations to a logical device in the consistency group are processed even when the reject window is in an open state, and C) means responsive to said blocking means and receipt of a write command for generating a predetermined return message to the host for a response thereto.

16. A system as recited in claim 15 wherein the host generates a setting command with a list of logical devices to be included in the local consistency group and a window size parameter that establishes the interval that the reject window is in its open state, said establishing means including means for defining the open state interval for each logical device in the local consistency group.

17. A system as recited in claim 16 wherein each logical device is associated with a time clock and said establishing means includes recording, for each logical device, the time defined by the time clock associated with that logical device.

18. A system as recited in claim 17 wherein said blocking means for a logical device in a local consistency group includes means for determining whether the time defined by the associated time clock at the time of the write command is concurrent with of the open state of the reject window.

19. A system as recited in claim 17 wherein said establishing means includes means for defining a data structure for each logical device in the local consistency group including a time stamp entry for receiving the time from the clock associated with the corresponding logical device and a window size entry for receiving the window size.

20. A system as recited in claim 19 wherein said blocking means includes means responsive to the receipt of a write command for determining whether the time of the time clock associated with the logical device when the write command is received is less than the time obtained by combining the time stamp and window size entries for the logical device identified in the write command.

21. A system as recited in claim 17 wherein the host generates an extension command with a list of logical devices included in the local consistency group, said system including means for responding to the extension command by replacing the recorded time for each logical device with the time defined by the time clock associated with that logical device when the extension command is processed for that logical device.

22. A system as recited in claim 16 wherein said establishing means includes means for generating a data structure for each logical device in the local consistency group, said data structure including a first flag having first and second states for controlling the removal of the generated data structure, and means for removing the data structure for a logical device upon receipt of a write command to that logical device after the reject window returns to the closed state and when the flag is in the first state.

23. A system as recited in claim 16 wherein said establishing means includes means for generating a data structure for each logical device in the local consistency group and wherein the host generates a resetting command, said system additionally comprising means for removing the data structures for all the logical devices in the local consistency group in response to a resetting command.

24. A system as recited in claim 23 wherein said removal means includes means for generating a message for transfer to the host for each logical device in which the reject window is in a closed state at the time the resetting command is processed for the corresponding logical device.

25. A system as recited in claim 24 wherein each logical device data structure includes a flag having a first state and having a second state indicating that the logical device is a member of the local consistency group, said removal step including means for generating a message when said flag is in the first state.

26. A system as recited in claim 16 wherein the setting command additionally includes a specific return message that is returned as the predetermined message, the host being responsive to the message by issuing the write command again, said establishing means including means for generating a data structure for each logical device in the local consistency group including an entry for the specific return message to be sent when a write command is blocked.

27. A system as recited in claim 26 wherein the setting command additionally includes a reject delay parameter, said establishing means including means for storing the reject delay parameter in the data structure for each logical device in the local consistency group and said message generating means including means for producing a delay between the operation of said blocking means and the operation of said return message generating means in response to the reject delay parameter.

28. A system as recited in claim 26 wherein the setting command additionally includes a reject delay parameter corresponding to a reject delay time and said establishing means includes means for storing the reject delay parameter in the data structure for each logical device in the local consistency group, said message generating means including means for delaying the operation of said return message generating means for an interval corresponding to the reject delay time after said blocking means operates to block a write command.

29. A program for use in a data processing system for maintaining data consistency in a group of logical devices formed in a disk storage system wherein each logical device includes magnetic storage media and responds to read and write commands issued from a host by performing a commanded operation and by transferring a message to the host indicating the outcome of the commanded operation, said program comprising:
A) a consistency group establishment module for establishing a plurality of the logical devices as a local consistency group with a reject window having an open state that extends for a predetermined interval and a closed state,
B) a blocking module for blocking, at a control for each logical device in the defined consistency group, only the processing of a write command to a logical device in the defined consistency group while the reject window is in the open state whereby commanded read operations to a logical device in the consistency group are processed even when the reject window is in an open state, and
C) a return message module responsive to said blocking means and receipt of a write command for generating a predetermined return message to the host for a response thereto.

30. A program as recited in claim 29 wherein the host generates a setting command with a list of logical devices to be included in the local consistency group and a window size parameter that establishes the interval that the reject window is in its open state, said consistency group establishment module defining the open state interval for each logical device in the local consistency group.

31. A program as recited in claim 30 wherein each logical device is associated with a time clock and said consistency group establishment module records, for each logical device, the time defined by the time clock associated with that logical device.

32. A program as recited in claim 31 wherein said blocking module for a logical device in a local consistency group determines whether the time defined by the associated time clock at the time of the write command is concurrent with of the open state of the reject window.

33. A program as recited in claim 31 wherein said consistency group establishment module defines a data structure for each logical device in the local consistency group including a time stamp entry for receiving the time from the clock associated with the corresponding logical device and a window size entry for receiving the window size.

34. A program as recited in claim 33 wherein said blocking module responds to the receipt of a write command by determining whether the time of the time clock associated with the logical device when the write command is received is less than the time obtained by combining the time stamp and window size entries for the logical device identified in the write command.

35. A program as recited in claim 31 wherein the host generates an extension command with a list of logical devices included in the local consistency group, said program including and extension module responsive to the extension command by replacing the recorded time for each logical device with the time defined by the time clock associated with that logical device when the extension command is processed for that logical device.

36. A program as recited in claim 30 wherein said consistency group establishment module generates a data structure for each logical device in the local consistency group, each data structure including a first flag having first and second states for controlling the removal of the generated data structure, and means for removes the data structure for a logical device upon receipt of a write command to that logical device after the reject window returns to the closed state and when the flag is in the first state.

37. A program as recited in claim 30 wherein said consistency group establishment module generates a data structure for each logical device in the local consistency group and wherein the host generates a resetting command, said program additionally comprising reset command processing module for removing the data structures for all the logical devices in the local consistency group in response to a resetting command.

38. A program as recited in claim 37 wherein said reset command processing module generates a message for transfer to the host for each logical device in which the reject window is in a closed state at the time the resetting command is processed for the corresponding logical device.

39. A program as recited in claim 38 wherein each logical device data structure includes a flag having a first state and having a second state indicating that the logical device is a member of the local consistency group, said reset command processing module generates a message when said flag is in the first state.

40. A program as recited in claim 30 wherein the setting command generating a specific return message that is returned as the predetermined message, the host being responsive to the message by issuing the write command again, said consistency group establishment module generating a data structure for each logical device in the local consistency group including an entry for the specific return message to be sent when a write command is blocked.

41. A program as recited in claim 40 wherein the setting command additionally includes a reject delay parameter, said consistency group establishment module stores the reject delay parameter in the data structure for each logical device in the local consistency group and said return message and producing a delay between the operation of said blocking module and the operation of said return message generating means in response to the reject delay parameter.

42. A program as recited in claim 40 wherein the setting command additionally includes a reject delay parameter corresponding to a reject delay time and said consistency group establishment module stores the reject delay parameter in the data structure for each logical device in the local consistency group, a return message by delay for an interval corresponding to the reject delay time after said blocking module operates to block a write command.

* * * * *